(12) United States Patent
Jensen

(10) Patent No.: US 6,745,878 B1
(45) Date of Patent: Jun. 8, 2004

(54) TRANSMISSION CLUTCH INTERLOCK

(75) Inventor: Michael Ray Jensen, Coffeyville, KS (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/350,926

(22) Filed: Jan. 22, 2003

(51) Int. Cl.$^7$ ............................................. F16H 59/56
(52) U.S. Cl. .................. 192/3.63; 192/3.61; 74/473.21; 74/473.24; 74/473.26
(58) Field of Search .................. 192/3.63, 3.61, 192/3.62; 74/473.24, 473.25, 473.26, 473.21, 473.23, 473.28; F16H 59/56

(56) References Cited

U.S. PATENT DOCUMENTS

| | | | | |
|---|---|---|---|---|
| 1,893,405 A | * | 1/1933 | Gaylord | 192/3.63 |
| 2,206,221 A | * | 7/1940 | Carter | 192/3.63 |
| 2,748,910 A | * | 6/1956 | Klecker | 192/3.63 |
| 3,265,170 A | | 8/1966 | Olnhausen | 192/3.5 |
| 4,146,120 A | * | 3/1979 | Stevens | 192/3.63 |
| 4,549,637 A | | 10/1985 | Huckler et al. | 192/3.63 |
| 4,646,584 A | | 3/1987 | Okubo et al. | 74/475 |
| 4,886,151 A | | 12/1989 | Muller et al. | 192/3.62 |
| 5,275,266 A | * | 1/1994 | Balass | 192/3.63 |
| 6,050,377 A | | 4/2000 | Cederberg et al. | 192/3.63 |

OTHER PUBLICATIONS

New Holland, "Part 5—Transmission Systems"; pp. 10, 14 & 15; Date unknown.
Funk Manufacturing, "GRP, Transaxle". 7 Pages, 1999–2000.

* cited by examiner

Primary Examiner—Charles A Marmor
Assistant Examiner—Eric M. Williams

(57) ABSTRACT

An interlock mechanism is provided for a transmission system having a gear unit with a plurality of selectable gear ratios. A manually operated clutch control pedal is manually movable from a clutch engaged position to a clutch disengaged position. The transmission has a pair of shift rails movable to select gear ratios. The shift rails have detent grooves which interact with a pair of detent balls. An interlock member is normally in a lock position wherein the interlock member engages both detent balls and holds them in the detent grooves to prevent movement of either or both shift rails. The interlock member is movable to a release position wherein the interlock member is disengaged from the both detent balls whereby the detent balls will allow one of the shift rails to be moved. An interlock spring is biased to urge the interlock member to the lock position. A linkage couples the interlock member to a clutch pedal so that movement of the clutch control member fully to its disengaged position causes the interlock member to move to its release position.

11 Claims, 5 Drawing Sheets

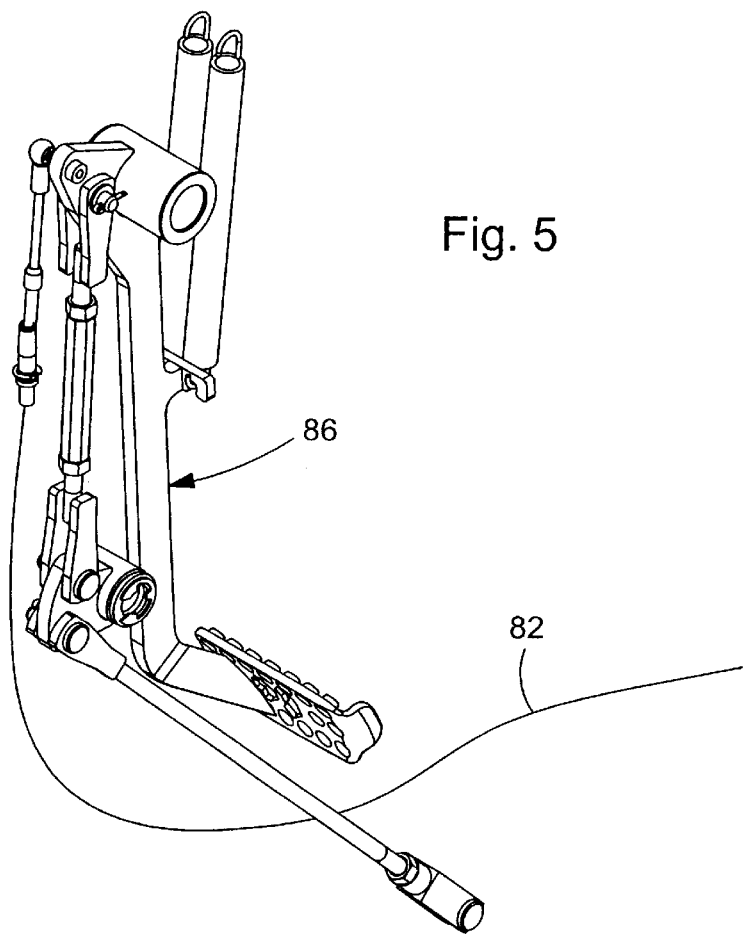
Fig. 5
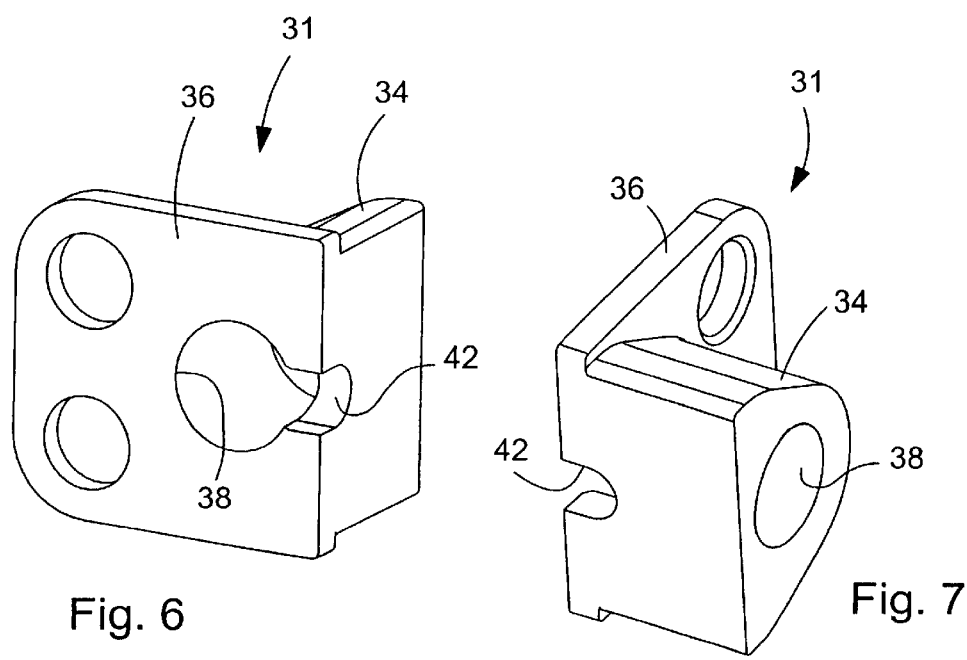
Fig. 6
Fig. 7

TRANSMISSION CLUTCH INTERLOCK

BACKGROUND

The present invention relates to an interlock system which prevents transmission shifting unless the clutch pedal is fully depressed.

A known manually operated synchronized transmission includes a pair of ratio selecting shift rails which are moved in order to shift the gear ratio of the transmission and a clutch pedal which is depressed to disengage a clutch. A pair of detent balls interact with the shift rails to prevent both rails from being moved simultaneously. However, with this transmission it is possible to move either rail and perform a gear or speed shift when the clutch is not fully disengaged. This can damage the synchronizers of the transmission.

A commercially available tractor includes a transmission with a pair of shift rails and a clutch interlock, but the interlock locks the position of only one of the shift rails and does not prevent all possible gear shifts when the clutch pedal is not fully depressed.

U.S. Pat. No. 4,146,120, issued in 1979 to Stevens discloses a transmission control system for a 6 speed transmission wherein a gated speed select lever is coupled to a single speed select spool and to a neutral select spool in a hydraulically actuated control unit. Different transmission speeds or gear ratios are selected by moving the speed select spool. A clutch control lever is coupled to a hydraulic control unit which controls a hydraulically operated input clutch. It appears that a hydraulically operated interlock detent mechanism prevents movement of the neutral select spool, which in turn prevents the speed select lever from moving out of its neutral position unless the clutch control lever is moved to disengage the clutch. This detent mechanism requires a complicated arrangement of hydraulic valves, conduits and actuators. This system does not have a pair of movable speed select spools.

It would be desirable to have a simple interlock mechanism for a transmission having at least a pair of speed select rails or spools and which prevents speed selecting through both rails unless a clutch pedal is fully depressed and the clutch is fully disengaged.

SUMMARY

Accordingly, an object of this invention is to provide a system for a transmission with a pair of shift rails which prevents gear shifts via these shift rails unless the clutch is completely disengaged.

A further object of the invention is to provide such a system which does not require complex hydraulic valves and circuitry.

These and other objects are achieved by the present invention, wherein an interlock mechanism is provided for a transmission system. The transmission system includes a gear unit with a plurality of selectable gear ratios, a manually operated clutch control member or pedal manually movable from an engaged position to a disengaged position, and a pair of shift rails movable to select gear ratios. Each rail has a detent groove formed therein. The transmission also includes a pair of detent balls which operatively engage the shift rails. The interlock mechanism includes an interlock member which is movable from a lock position wherein the interlock member engages both balls and holds both of them partially received by the detent grooves in the rails, to a release position wherein the interlock member is spaced apart from both detent balls, and the balls interact with the grooves to permit one or the other of the rails to move.

The interlock member is non-rotatably mounted on a rotatable shaft and an interlock lever is non-rotatably coupled to the shaft. An interlock spring is coupled to the interlock lever and is biased to urge the interlock member to the lock position. A push/pull cable couples the lever to the clutch pedal so that when the clutch pedal is depressed to its clutch fully disengaged position, the lever pivots and moves the interlock member to move to its release position. The rails are supported by a pair of spaced apart rail support members. Each support member has a bore which slidably receives a corresponding one of the rails and has a notch or opening extending from the bore to a surface of the support member facing towards the other support member. Each detent ball is held in a corresponding one of the notches and adjacent a corresponding detent groove.

The interlock member, when in its lock position, is positioned between the support members and between the detent balls, and engages both detent balls and moving both detent balls into their corresponding detent grooves to prevent movement of both rails, the interlock member, when in its release position, being positioned apart from both detent balls to allow both detent balls to move out of their corresponding detent grooves to prevent movement of one of the rails.

BRIEF DESCRIPTION OF THE DRAWINGS

FIG. 5 is a perspective view of the clutch pedal and cable to which is connected the transmission/clutch interlock system of FIG. 1; and FIGS. 6 and 7 are perspective views of one of the shift rail support members of FIG. 1.

DETAILED DESCRIPTION

Figure 1:
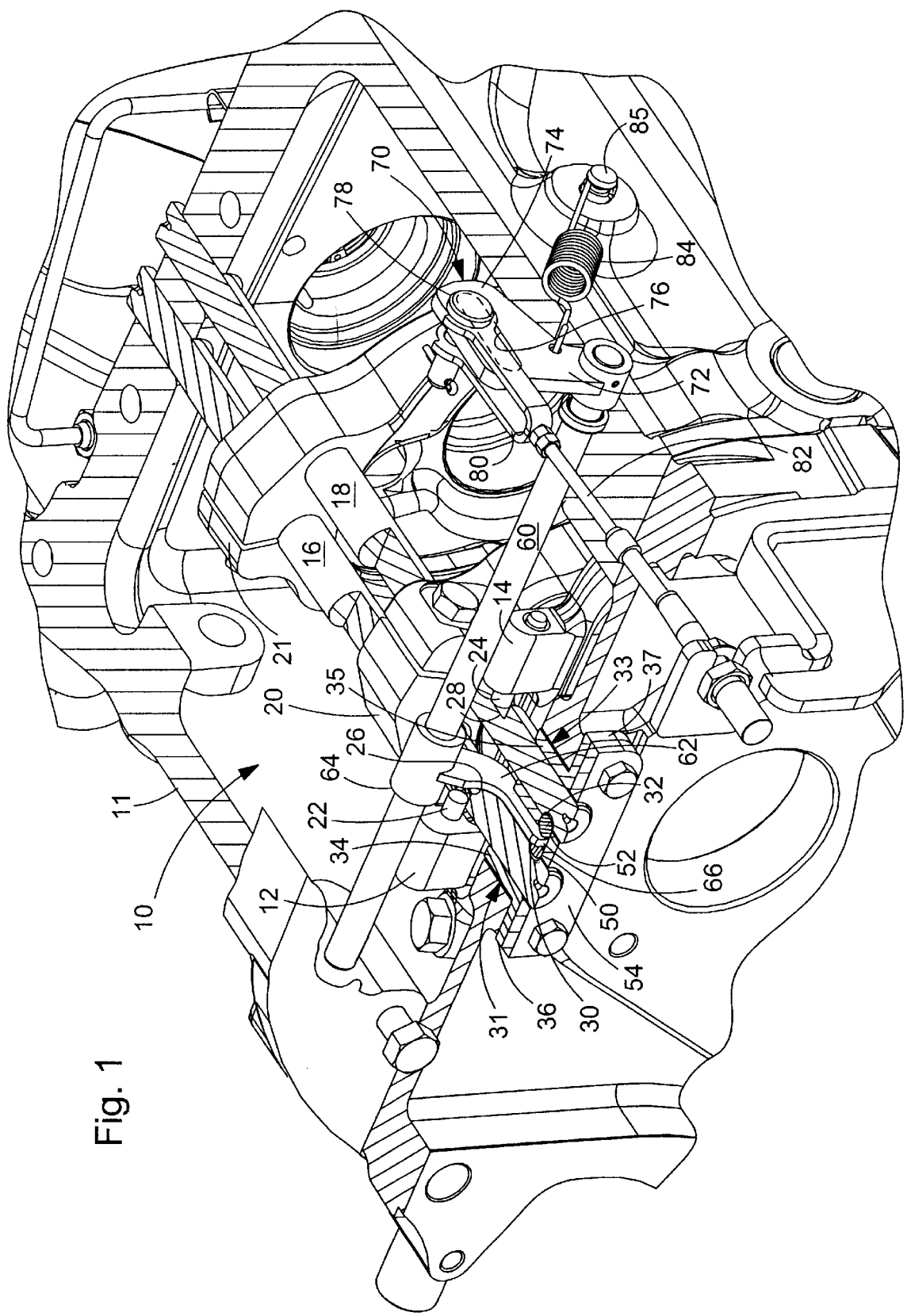
FIG. 1 is a perspective, partially sectional view of a transmission/clutch interlock system, of the present invention in a clutch engaged condition and with portions removed for clarity.
Figure 2:
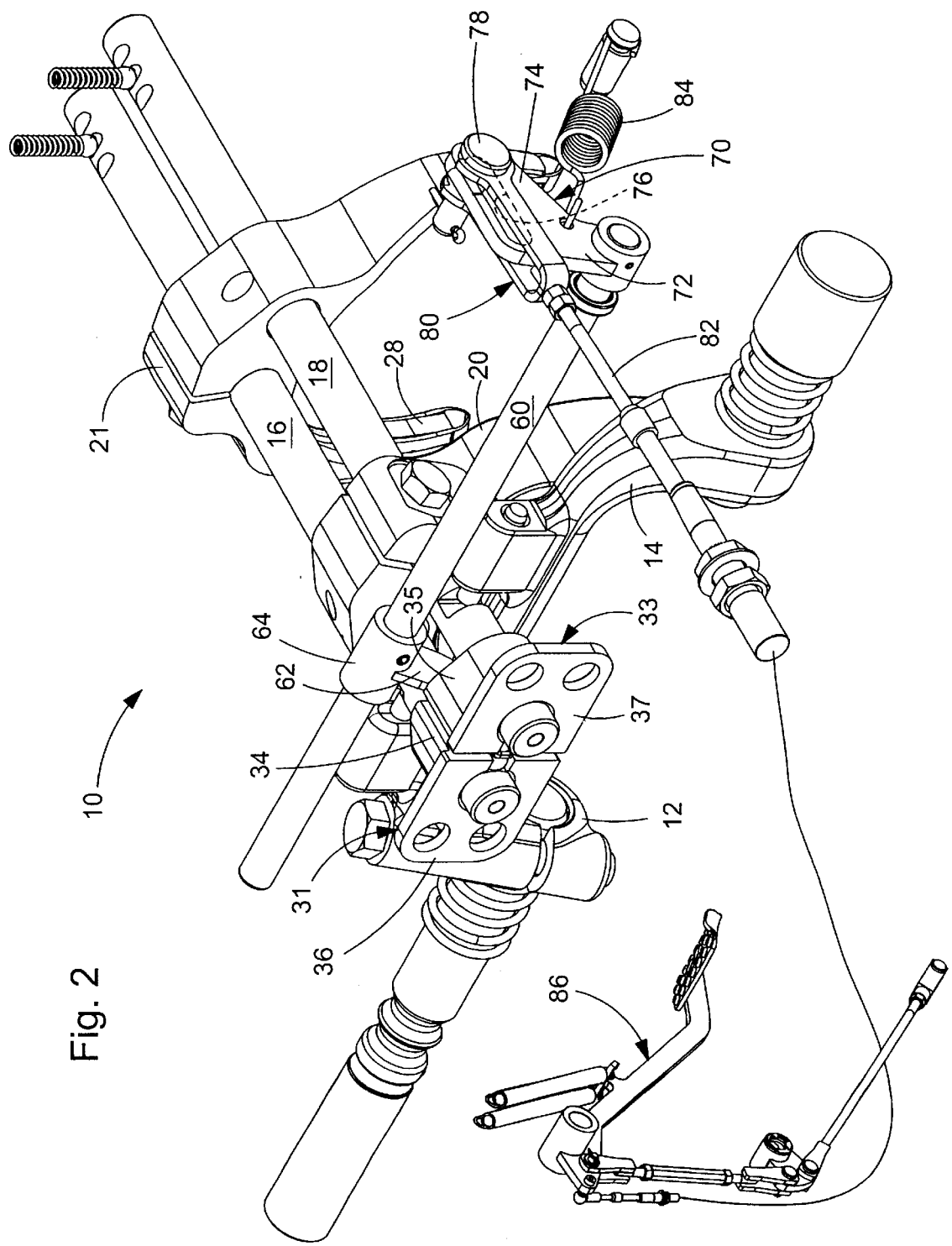
FIG. 2 is a perspective view of portions of the assembly of FIG. 1.
Figure 3:
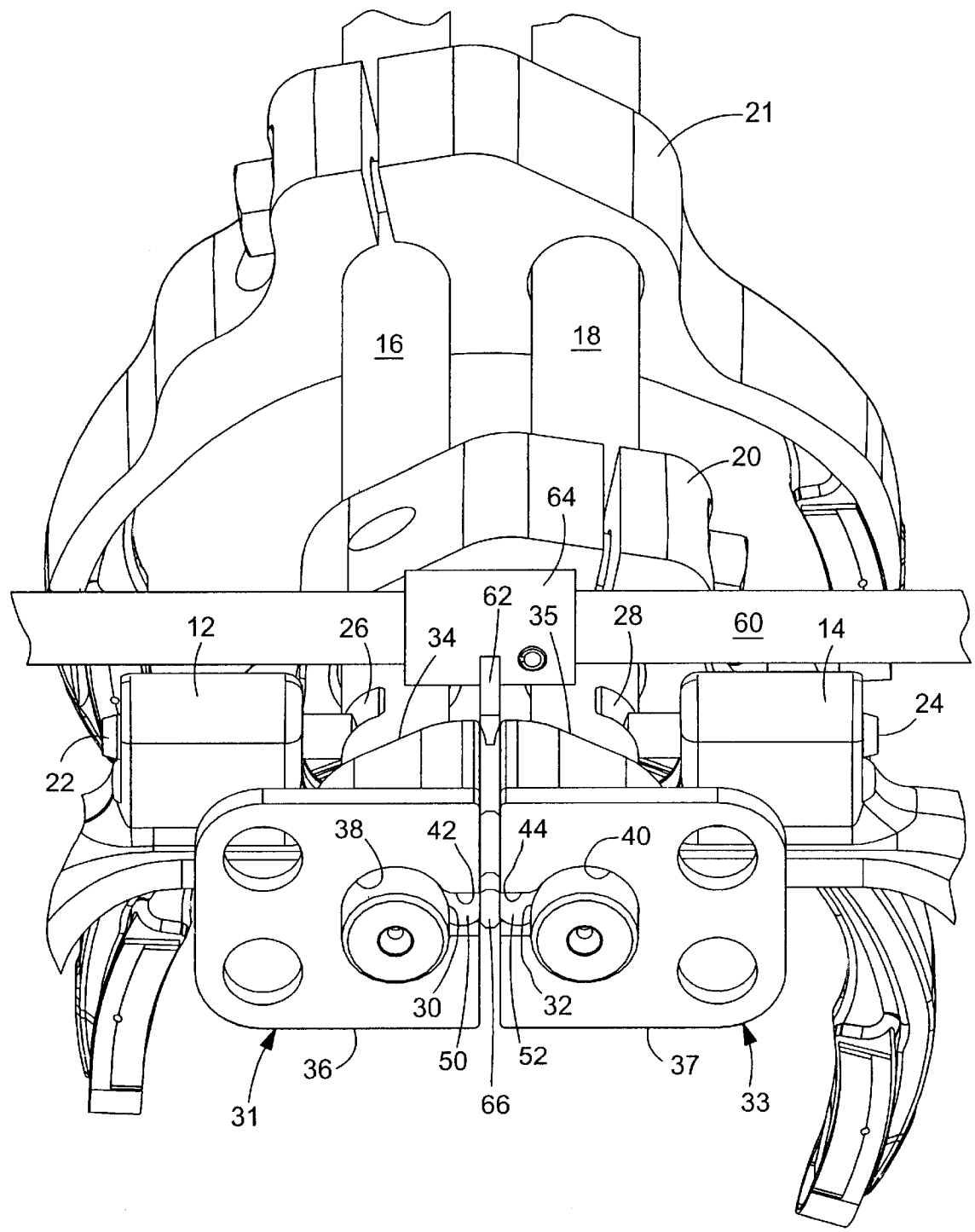
FIG. 3 is a another perspective view of a portion of the interlock system of FIG. 1.

Referring to FIGS. 1, 2 and 3, a transmission shift mechanism 10 includes a shift actuator with left and right parts 12 and 14 and a pair of shift rails 16 and 18 which are supported in a transmission housing 11. The shift actuator parts 12 and 14 are coupled to a conventional manually operated shift lever (not shown). A shift fork 20 is fixed to shift rail 18 and slidably receives rail 16. A shift fork 21 is fixed to shift rail 16 and slidably receives rail 18. The shift forks 20 and 21 are coupled to, conventional transmission gear shifting elements (not shown). Actuator parts 12 and 14 have pins 22, 24 which are received in corresponding notches 26, 28 formed in the sides of rails 16 and 18. A pair of detent grooves 30 and 32 are formed near the ends of rails 16 and 18, respectively. Grooves 30 and 32 interact with conventional detent balls 50 and 52 so that only one of rails 16 and 18 can be moved at a time. The structures described up to this point are conventional.

According to the present invention, the mechanism 10 also includes a pair of spaced apart support members 31 and 33. As best seen in FIGS. 2, 3, 5, 6 and 7, each support member 31, 33 includes a housing 34, 35 and an end plate 36, 37 which is bolted to a portion of the transmission housing 11. Bores 38 extends through housing 34 and plate 36. Bore 40 extends through housing 35 and end plate 37. Bores 38, 40 each slidably receive a corresponding one of the rails 16, 18. Each support member 31, 33 also includes a notch or opening 42, 44 which extends laterally and inwardly from the corresponding one of bores 38, 40 to the space between support members 31, 33 and to a surface of the support member which faces towards the other support member. Each notch 42, 44 holds a corresponding one of the detent balls 50, 52 adjacent to the corresponding one of detent grooves 30, 32. A plate 54, partially seen in FIG. 1, is attached to and covers the end plates 36 and 37 of support members 31 and 33. Plate 54 also has a pair of bores which slidably receive the rails 16 and 18. Plate 54 extends across the space between support members 31 and 33 and retains the detent balls 50 and 52 within the notches 42 and 44. Plate 54 and support members 31 and 33 are attached to a portion of housing 11 by bolts.

An interlock shaft 60 is rotatably supported by transmission housing 11 and extends above and across rails 16 and 18. An interlock finger 62 projects from a collar 64 which is non-rotatably fixed on shaft 60 to an end 66.

As best seen in FIG. 1, an interlock lever 70 has a first arm 72 non-rotatably coupled to an end of shaft 60 and a second arm 74. A slot 76 is formed in arm 74. Slot 76 slidably receives a pin 78. A yoke 80 couples pin 78 to and end of push/pull cable 82. An interlock spring 84 has a first end coupled to the lever 70 and a second end coupled to an anchor pin 85 which projects form a side of the housing 11. Spring 84 is biased to urge lever 70 clockwise, viewing FIGS. 1 and 2. The other end of cable 82 is coupled to a conventional manually operated clutch pedal 86. Clutch pedal 86 is manually movable from a pedal released, clutch engaged position shown in FIG. 2 to a pedal depressed, clutch disengaged position shown in FIG. 5.

As shown in FIGS. 1, 2 and 3, in the clutch engaged position, spring 84 holds interlock finger 62 in a locked position wherein the finger end 66 is interposed between detent balls 50, 52. In this position the finger end 66 holds both detent balls 50, 52 partially received by the corresponding detent grooves 30, 32, and the detent balls 50, 52 thereby preventing movement of either or both rails 16 and 18. Thus, mechanism 10 prevents all gear shifts via the shift rails when the clutch pedal is released and the clutch (not shown) is engaged.

Figure 4:
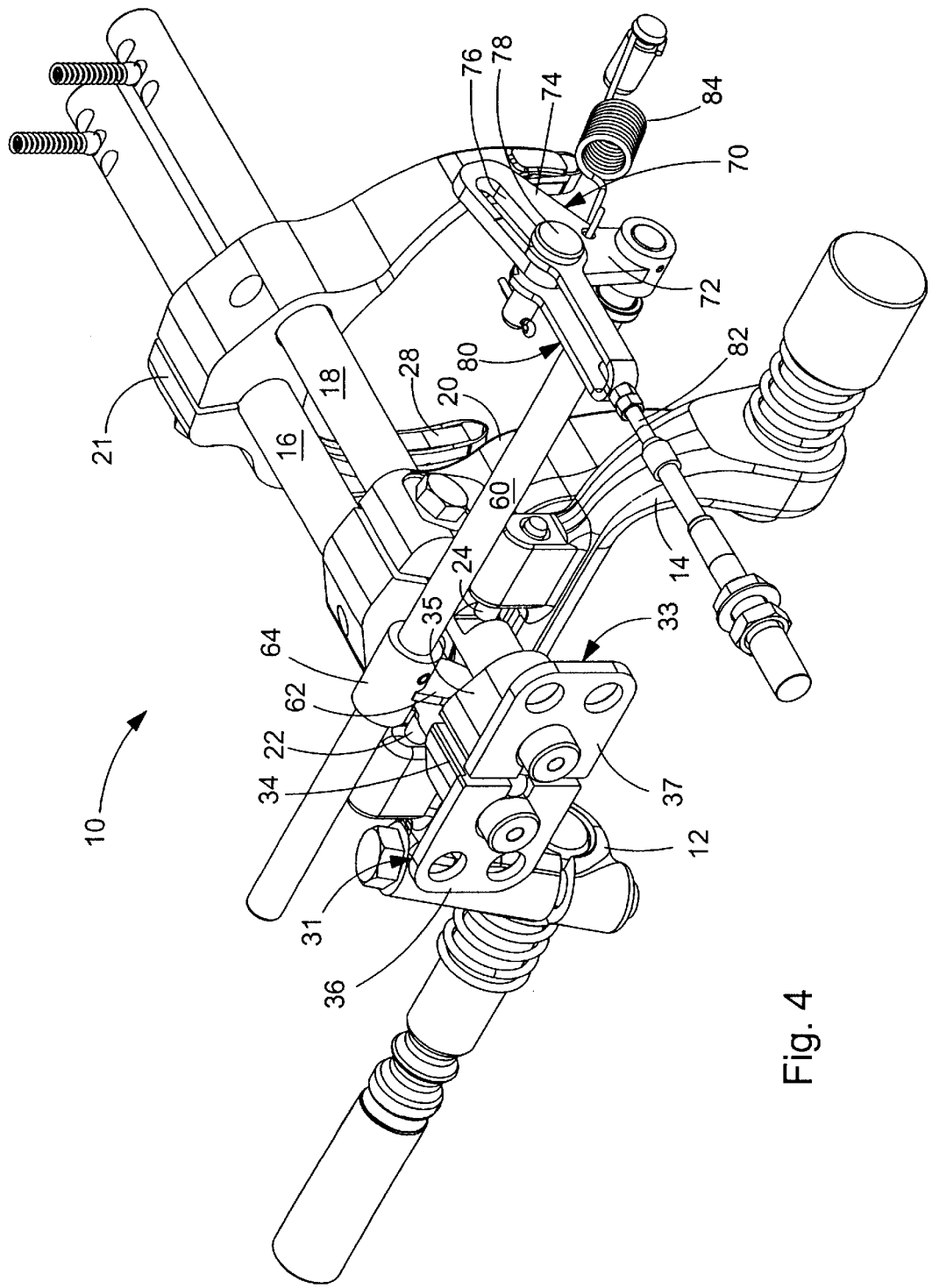
FIG. 4 is a perspective view of the transmission/clutch interlock system of FIG. 1 in a pedal depressed, clutch disengaged condition.

Referring now to FIG. 5, with clutch pedal 86 fully depressed into its clutch disengaged position, cable 82 and yoke 80 pull pin 78 to the left relative to the position shown in FIG. 1, whereby pin 78 engages the left end of slot 76 and pivots lever 70 and shaft 60 counterclockwise against the bias of spring 84. This moves interlock finger 62 downward into the released position shown in FIG. 4, wherein the end 66 is removed from between detent balls 50, 52 and is spaced apart from and below balls 50, 52. In this condition one or the other of detent balls 50, 52 may be moved out of its corresponding detent groove 30 or 32, so that the corresponding rail 16 or 18 can be moved in the known manner to change the gear ratio of the transmission when the pedal 86 is depressed and the clutch (not shown) is disengaged. However, detent balls 50, 52 still cooperate with grooves 30, 32 to prevent simultaneous movement of both rails 16 and 18.

While the present invention has been described in conjunction with a specific embodiment, it is understood that many alternatives, modifications and variations will be apparent to those skilled in the art in light of the foregoing description. Accordingly, this invention is intended to embrace an such alternatives, modifications and variations which fall within the spirit and scope of the appended claims.

I claim:

1. An interlock mechanism for a transmission system having a gear unit with a plurality of selectable gear ratios, a manually operated clutch control member manually movable from an engaged position to a disengaged position, having a pair of shift rails movable to select gear ratios, and having a pair of detent members, each movable into a detent position wherein, it engages a corresponding one of the shift rails and prevents movement thereof, the interlock mechanism comprising:

an interlock member, the interlock member being movable from a lock position wherein the interlock member engages both detent members and holds both detent members in their detent positions to a release position wherein the interlock member is disengaged from both detent members;

an interlock spring biased to urge the interlock member to the lock position; and a linkage coupling the interlock member to the clutch control member so that movement of the clutch control member fully to its disengaged position causes the interlock member to move to its release position.

2. The interlock mechanism of claim 1, wherein:

the interlock member is non-rotatably mounted on a rotatable shaft;

an interlock lever is non-rotatably coupled to the shaft and is coupled to the clutch control member; and the interlock spring is coupled to the interlock lever.

3. The interlock mechanism of claim 2, wherein:

the interlock lever has a first arm non-rotatably coupled to the shaft and a second arm having a slot formed therein; and a pin slidably received by the slot and coupled to the clutch control member.

4. The interlock mechanism of claim 3, wherein:

the pin is coupled to the clutch control member by a push/pull cable.

5. The interlock mechanism of claim 2, wherein:

a cable is coupled between the interlock lever and the clutch control member.

6. The interlock mechanism of claim 1, further comprising:

a pair of spaced apart rail support members, each support member having a bore slidably receiving a corresponding one of the rails and having a notch extending from the bore to a surface of the support member facing towards the other support member, each rail having a detent groove formed therein; and a pair of detent balls, each detent ball being held in a corresponding one of the notches, the interlock member, when in its lock position, being positioned between and engaging both detent balls and moving both detent balls into their corresponding detent grooves to prevent movement of both rails, the interlock member, when in its release position, being positioned apart from both detent balls to allow both detent balls to move out of their corresponding detent grooves to prevent movement of one of the rails.

7. The interlock mechanism of claim 6, further comprising:

a cover plate covering an end of both support members and holding both detent balls in the notches.

8. The interlock mechanism of claim 1, wherein:

the interlock member is non-rotatably mounted on a rotatable shaft;

an interlock lever is non-rotatably coupled to the shaft and is coupled to the clutch control member, the interlock lever having a slot formed therein, and the interlock spring being coupled to the interlock lever; and a pin is slidably received by the slot and coupled to the clutch control member.

9. The interlock mechanism of claim 8, wherein:

the pin is coupled to the clutch control member by a push/pull cable.

10. The interlock mechanism of claim 1, wherein:

the interlock member is non-rotatably mounted on a rotatable shaft;

an interlock lever is non-rotatably coupled to an end of the shaft which is exterior to the housing, the lever being coupled to the clutch control member; and the interlock spring is coupled to the interlock lever.

11. The interlock mechanism of claim 10, wherein:

the shaft extends across the shift rails and is perpendicular to the shift rails.

* * * * *